United States Patent
Lee et al.

(10) Patent No.: US 12,136,743 B2
(45) Date of Patent: Nov. 5, 2024

(54) SEPARATOR FOR LITHIUM SECONDARY BATTERY, AND LITHIUM SECONDARY BATTERY COMPRISING SAME

(71) Applicant: Samsung SDI Co., Ltd., Yongin-si (KR)

(72) Inventors: Jungyoon Lee, Yongin-si (KR); Gain Kim, Yongin-si (KR); Yangseob Kim, Yongin-si (KR); Yongkyoung Kim, Yongin-si (KR); Dongwan Seo, Yongin-si (KR); Yeonjoo Choi, Yongin-si (KR); Hyeonsun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 543 days.

(21) Appl. No.: 17/297,373

(22) PCT Filed: Aug. 9, 2019

(86) PCT No.: PCT/KR2019/010129
§ 371 (c)(1),
(2) Date: May 26, 2021

(87) PCT Pub. No.: WO2020/138627
PCT Pub. Date: Jul. 2, 2020

(65) Prior Publication Data
US 2022/0037739 A1 Feb. 3, 2022

(30) Foreign Application Priority Data
Dec. 26, 2018 (KR) .......................... 10-2018-0169595

(51) Int. Cl.
*H01M 50/446* (2021.01)
*H01M 4/62* (2006.01)
(Continued)

(52) U.S. Cl.
CPC ......... *H01M 50/446* (2021.01); *H01M 4/622* (2013.01); *H01M 10/0525* (2013.01); *H01M 50/443* (2021.01)

(58) Field of Classification Search
CPC .. H01M 50/446; H01M 50/443; H01M 4/622; H01M 10/0525
See application file for complete search history.

(56) References Cited

U.S. PATENT DOCUMENTS

2006/0263693 A1   11/2006   Kim et al.
2010/0112454 A1   5/2010    Visco
(Continued)

FOREIGN PATENT DOCUMENTS

CA   2881701 A1   3/2014
CN   1855584 A    11/2006
(Continued)

OTHER PUBLICATIONS

Technical Data Sheet of Boehmite 200SM by Nalbatec AG, retrieved from https://nabaltec.de/en/products/boehmite/ (Year: 2023).*
(Continued)

*Primary Examiner* — Aiqun Li
(74) *Attorney, Agent, or Firm* — Lewis Roca Rothgerber Christie LLP

(57) ABSTRACT

The present invention relates to a separator for a lithium secondary battery, and a lithium secondary battery including the same. The separator includes a porous substrate and a coating layer on at least one surface of the porous substrate, wherein the coating layer includes a binder including a (meth)acrylic copolymer including a first structural unit derived from (meth)acrylamide, a second structural unit derived from (meth)acrylonitrile, and a third structural unit derived from (meth)acrylamidosulfonic acid, a (meth)acrylamidosulfonic acid salt or a combination thereof; first
(Continued)

inorganic particles; and second inorganic particles, wherein the average diameter of the first inorganic particles is 400 nm to 600 nm, and the average diameter of the second inorganic particles is smaller than the average diameter of the first inorganic particles.

14 Claims, 6 Drawing Sheets

(51) Int. Cl.
  *H01M 10/0525* (2010.01)
  *H01M 50/443* (2021.01)

(56) References Cited

U.S. PATENT DOCUMENTS

| | | |
|---|---|---|
| 2010/0233409 A1 | 9/2010 | Kamiya et al. |
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0342226 A1 | 5/2014 | Toyoda |
| 2014/0186680 A1 | 7/2014 | Kim et al. |
| 2014/0272532 A1 | 9/2014 | Park et al. |
| 2014/0147726 A1 | 11/2014 | Sasaki |
| 2015/0010815 A1 | 1/2015 | Chung et al. |
| 2015/0030933 A1 | 1/2015 | Goetzen et al. |
| 2015/0111086 A1 | 4/2015 | Arnold et al. |
| 2016/0013465 A1 | 1/2016 | Akiike |
| 2016/0141581 A1 | 5/2016 | Sasaki et al. |
| 2016/0149184 A1 | 5/2016 | Nam et al. |
| 2016/0149190 A1 | 5/2016 | Fukuchi |
| 2016/0181618 A1 | 6/2016 | Hoshiba |
| 2016/0344007 A1 | 11/2016 | Toyoda et al. |
| 2017/0162848 A1 | 6/2017 | Pan et al. |
| 2017/0200932 A1 | 7/2017 | Sasaki et al. |
| 2017/0326863 A1 | 11/2017 | Wang et al. |
| 2017/0338461 A1 | 11/2017 | Seo et al. |
| 2018/0053963 A1 | 2/2018 | Tanaka |
| 2018/0114966 A1 | 4/2018 | Yasuda et al. |
| 2018/0337381 A1 | 11/2018 | Seo et al. |
| 2018/0351149 A1 | 12/2018 | Aklike et al. |
| 2018/0358649 A1 | 12/2018 | Inoue et al. |
| 2019/0013504 A1 | 1/2019 | Choi et al. |
| 2019/0106521 A1 | 4/2019 | Takamatsu |
| 2019/0245183 A1 | 8/2019 | Jeong et al. |
| 2019/0288293 A1 | 9/2019 | Arihara |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | |
|---|---|---|
| CN | 102770984 A | 11/2012 |
| CN | 102893427 A | 1/2013 |
| CN | 103390740 A | 11/2013 |
| CN | 103620820 A | 3/2014 |
| CN | 103718336 A | 4/2014 |
| CN | 103857732 A | 6/2014 |
| CN | 104277746 A | 1/2015 |
| CN | 104521031 A | 4/2015 |
| CN | 105324868 A | 2/2016 |
| CN | 105378989 A | 3/2016 |
| CN | 105440770 A | 3/2016 |
| CN | 105531854 A | 4/2016 |
| CN | 106328865 A | 1/2017 |
| CN | 107394087 A | 11/2017 |
| CN | 107851765 A | 3/2018 |
| CN | 108305970 A | 7/2018 |
| CN | 108463904 A | 8/2018 |
| CN | 108666499 A | 10/2018 |
| CN | 108963148 A | 12/2018 |
| CN | 109037564 A | 12/2018 |
| CN | 109075291 A | 12/2018 |
| CN | 113228397 A | 8/2021 |
| EP | 2549564 A2 | 1/2013 |
| EP | 2779277 A1 | 9/2014 |
| EP | 3246969 A1 | 11/2017 |
| EP | 3588636 A1 | 1/2020 |
| EP | 3748730 A1 | 12/2020 |
| EP | 3855529 A1 | 7/2021 |
| EP | 3902027 A1 | 10/2021 |
| EP | 3902028 A1 | 10/2021 |
| EP | 3905381 A | 11/2021 |
| EP | 3907781 A1 | 11/2021 |
| JP | 03-175023 A | 7/1991 |
| JP | 2011-832 A | 1/2011 |
| JP | 2011-5670 A | 1/2011 |
| JP | 2014-149935 A | 8/2014 |
| JP | 2014-225410 A | 12/2014 |
| JP | 2014-229406 A | 12/2014 |
| JP | 2015-088253 A | 5/2015 |
| JP | 2015-88253 A | 5/2015 |
| JP | 2015-185530 A | 10/2015 |
| JP | 2016-105398 A | 6/2016 |
| JP | 2017-050149 A | 3/2017 |
| JP | 2017-103206 A | 6/2017 |
| JP | 2018-26266 A | 2/2018 |
| JP | 2018-34496 A | 3/2018 |
| JP | 2018-092701 A | 6/2018 |
| JP | 2019-57486 A | 4/2019 |
| JP | 2020-87591 A | 6/2020 |
| KR | 10-2011-0097715 A | 8/2011 |
| KR | 10-2011-0104791 A | 9/2011 |
| KR | 10-2012-0093772 A | 8/2012 |
| KR | 10-2012-0097238 A | 9/2012 |
| KR | 10-1254693 B1 | 4/2013 |
| KR | 10-2014-0044757 A | 4/2014 |
| KR | 10-2014-0116415 A | 10/2014 |
| KR | 10-2014-0147742 A | 12/2014 |
| KR | 10-2015-0034825 A | 4/2015 |
| KR | 10-2016-0033692 A | 3/2016 |
| KR | 10-2016-0061165 A | 5/2016 |
| KR | 10-2016-0109669 A | 9/2016 |
| KR | 10-2016-0118979 A | 10/2016 |
| KR | 10-2017-0003020 A | 1/2017 |
| KR | 10-2017-0015149 A | 2/2017 |
| KR | 10-2017-0045438 A | 4/2017 |
| KR | 10-2017-0084597 A | 7/2017 |
| KR | 10-2017-0095024 A | 8/2017 |
| KR | 10-2017-0129645 A | 11/2017 |
| KR | 10-2018-0003177 A | 1/2018 |
| KR | 10-1868240 B1 | 6/2018 |
| KR | 10-2018-0109740 A | 10/2018 |
| WO | WO 2009/060787 A1 | 5/2009 |
| WO | WO 2010/074205 A1 | 7/2010 |
| WO | WO 2013/080938 A1 | 6/2013 |
| WO | WO 2014/054919 A1 | 4/2014 |
| WO | WO 2014/136799 A1 | 9/2014 |
| WO | WO 2015/008626 A1 | 1/2015 |
| WO | WO 2015/046191 A1 | 4/2015 |
| WO | WO 2015/076571 A1 | 5/2015 |
| WO | WO 2015/122322 A1 | 8/2015 |
| WO | WO 2018/147714 A1 | 8/2018 |
| WO | WO 2018/155345 A1 | 8/2018 |

OTHER PUBLICATIONS

Technical Data Sheet of Boehmite AOH 60 by Nalbatec AG, retrieved from https://nabaltec.de/en/products/boehmite/ (Year: 2023).*
"Derive." New Oxford American Dictionary. Eds. Stevenson, Angus, and Christine A. Lindberg. : Oxford University Press, 2011. Oxford

(56) References Cited

OTHER PUBLICATIONS

Reference. Date Accessed Aug. 10, 2023, https://www.oxfordreference.com/view/10.1093/acref/9780195392883.001.0001/m_en_us1239627. (Year: 2011).
Chinese Decision of Rejection, with English translation, dated Jul. 1, 2023, issued in Chinese Patent Application No. 201980085911.X (21 pages).
Chinese Notice of Allowance, with English translation, dated Jan. 13, 2023, issued in Chinese Patent Application No. 201980055198.4 (8 pages).
Chinese Office Action, with English translation, dated Apr. 13, 2023, issued in corresponding Chinese Patent Application No. 201980083245.6 (6 pages).
Chinese Office Action, with English translation, dated Apr. 23, 2023, issued in Chinese Patent Application No. 201980085835.2 (15 pages).
Chinese Office Action, with English translation, dated Aug. 12, 2023, issued in Chinese Patent Application No. 201980082244.X (13 pages).
Chinese Office Action, with English translation, dated Aug. 3, 2022, issued in Chinese Patent Application No. 201980055198.4 (20 pages).
Chinese Office Action, with English translation, dated Jun. 22, 2023, issued in Chinese Patent Application No. 201980087908.1 (23 pages).
Chinese Office Action, with English translation, dated Oct. 24, 2022, issued in Chinese Patent Application No. 201980087908.1 (18 pages).
Chinese Office Action, with English translation, dated Sep. 20, 2022, issued in corresponding Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Aug. 3, 2022, issued in corresponding European Patent Application No. 19898125.0 (11 pages).
EPO Extended European Search Report dated Dec. 6, 2022, issued in European Patent Application No. 19910153.6 (9 pages).
EPO Extended European Search Report dated May 17, 2022, issued in European Patent Application No. 19861770.6 (10 pages).
EPO Extended European Search Report dated Oct. 14, 2022, issued in European Patent Application No. 19904249.0 (9 pages).
EPO Third Party Observations dated Sep. 21, 2021, issued in European Patent Application No. 19861770.6 (20 pages).
Ghosh, Prof. Premamoy, "Polymer Science Fundamentals of Polymer Science: Molecular Weights of Polymers," Sep. 2006, XP055608363, 22 pages.
International Search Report for Application No. PCT/KR2019/008767 dated Oct. 25, 2019, 4pp.
International Search Report for Application No. PCT/KR2019/009085 dated Oct. 30, 2019, 4pp.
International Search Report for Application No. PCT/KR2019/010130 dated Nov. 26, 2019, 4pp.
International Search Report for corresponding Application No. PCT/KR2019/010128 dated Nov. 26, 2019, 6pp.
Japanese Office Action dated Jun. 20, 2022, issued in Japanese Patent Application No. 2021-513921 (6 pages).
Notification of Third Party Observation dated Jun. 6, 2022, 15 pages.
US Final Office Action dated Aug. 18, 2023, issued in U.S. Appl. No. 17/414,043 (19 pages).
US Final Office Action dated Sep. 25, 2023, issued in U.S. Appl. No. 17/296,501 (26 pages).
US Office Action dated Jun. 14, 2023, issued in U.S. Appl. No. 17/296,501 (29 pages).
US Office Action dated May 2, 2023, issued in U.S. Appl. No. 17/414,043, 19 pages.
EPO Extended European Search Report dated Dec. 20, 2022, issued in European Patent Application No. 19902175.9 (8 pages).
International Search Report for corresponding Application No. PCT/KR2019/010129 dated Nov. 28, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
International Search Report for corresponding Application No. PCT/KR2019/009136 dated Oct. 30, 2019, 4pp.
International Search Report for corresponding Application No. PCT/KR2019/009945 dated Nov. 20, 2019, 4pp.
Chinese Office Action for CN Appl. 201980084182.6 dated May 31, 2023, 19 pgs.
Chinese Office Action, with English translation, dated Mar. 8, 2023, issued in corresponding Chinese Patent Application No. 201980085911.X (20 pages).
Chinese Office Action, with English translation, dated Apr. 3, 2023, issued in Chinese Patent Application No. 201980087928.9 (28 pages).
Chinese Office Action, with English translation, dated Apr. 20, 2023, issued in Chinese Patent Application No. CN 201980082244.X (13 pages).
International Search Report for Application No. PCT/KR2019/010131 dated Nov. 28, 2019, 4 pp.
European Search Report for EP 19898811.5 dated Aug. 3, 2022, 11 pages.
European Search Report for EP 19902841.6 dated Aug. 12, 2022, 12 pages.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006, XP055608363, 22 pgs.
Chang, Song, et al., "A review of functional separator for improving the flammability of lithium-sulfur batteries," The Chinese Journal of Process Engineering, vol. 18 S1, Nov. 2018, 10 pages.
Li, Xia, et al., "Derivatives of Acrylamide and Their Application," Fine and Specialty Chemicals, vol. 13, No. 24, Dec. 2005, 5 pages.
Liu, Meihua, et al., "Enhancement on the thermostability and wettability of lithium-ion batteries separator via surface chemical modification," Materials Letters, vol. 208, 2017, pp. 98-101.
Chinese Notice of Allowance, with English translation, dated Aug. 30, 2023, issued in Chinese Patent Application No. 201980084182.6 (8 pages).
US Office Action dated Mar. 28, 2024, issued in U.S. Appl. No. 17/296,528 (7 pages).
US Final Office Action dated May 22, 2024, issued in U.S. Appl. No. 17/294,343 (22 pages).
JP 2020087591—Translation, 20 pages.
WO 2015046191—Translation, 17 pages.
US Notice of Allowance dated Jan. 24, 2024, issued in U.S. Appl. No. 17/296,528 (11 pages).
US Office Action dated Feb. 7, 2024, issued in U.S. Appl. No. 17/294,343 (20 pages).
Partial CA 2881701 A1 provided with US Office Action dated Feb. 7, 2024, issued in U.S. Appl. No. 17/294,343.

(56) References Cited

OTHER PUBLICATIONS

U.S. Office Action dated Jun. 20, 2024, issued in U.S. Appl. No. 17/416,686 (19 pages).

* cited by examiner

SEPARATOR FOR LITHIUM SECONDARY BATTERY, AND LITHIUM SECONDARY BATTERY COMPRISING SAME

CROSS-REFERENCE TO RELATED APPLICATIONS

This application is a U.S. National Phase Patent Application of International Application Number PCT/KR2019/010129, filed on Aug. 9, 2019, which claims priority to Korean Patent Application Number 10-2018-0169595, filed on Dec. 26, 2018, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

For example, a method of increasing heat resistance of the separator by coating the separator with a mixture of inorganic particles having a large heat resistance and an organic binder having adherence is well known. However, this conventional method may not sufficiently secure desired adhesive strength and not uniformly applied to variously-sized separators.

DISCLOSURE

A separator for a lithium secondary battery having high heat resistance and strong adhesive strength, and a lithium secondary battery including the same are provided.

In an embodiment, a separator for a lithium secondary battery includes a porous substrate, and a coating layer on at least one surface of the porous substrate, wherein the coating layer includes a binder including a (meth)acrylic copolymer including a first structural unit derived from (meth)acrylamide, a second structural unit derived from (meth)acrylonitrile, and a third structural unit derived from (meth)acrylamidosulfonic acid, (meth)acrylamidosulfonic acid salt, or a combination thereof; first inorganic particles; and second inorganic particles; wherein the average diameter of the first inorganic particles is 400 nm to 600 nm, the average diameter of the second inorganic particles is smaller than the average diameter of the first inorganic particles.

The second inorganic particles may be included in an amount of less than 75 wt % based on the total amount of the first inorganic particles and the second inorganic particles.

The second inorganic particles may be included in an amount of 10 wt % to 60 wt % based on the total amount of the first inorganic particles and the second inorganic particles.

The second inorganic particles may have an average particle diameter (D50) of 50 nm to 200 nm.

A volume ratio of the first inorganic particles and the second inorganic particles may be 12:1 to 0.14:1 or 1.4:1 to 1.2:1.

The first inorganic particles and the second inorganic particles may each independently include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and a combination thereof.

A weight ratio the binder:a sum of the first inorganic particles and second inorganic particles may be 1:15 to 1:50.

The (meth)acrylic copolymer may have a glass transition temperature of 150° C. to 180° C.

The first structural unit may be included in an amount of 55 mol % to 90 mol % based on 100 mol % of the (meth)acrylic copolymer and the second structural unit and third structural unit may each independently be included in 5 mol % to 40 mol % based on 100 mol % of the (meth)acrylic copolymer.

The second structural unit derived from (meth)acrylonitrile may be included in an amount of 5 mol % to 40 mol % based on 100 mol % of the (meth)acrylic copolymer and the third structural unit derived from (meth)acrylamidosulfonic acid, (meth)acrylamidosulfonic acid salt, or a combination thereof may be included in an amount of 5 mol % to 10 mol % based on 100 mol % of the (meth)acrylic copolymer.

The first structural unit derived from (meth)acrylamide may be included in an amount of 80 mol % to 85 mol % based on 100 mol % of the (meth)acrylic copolymer, the second structural unit derived from (meth)acrylonitrile may be included in an amount of 10 mol % to 15 mol % based on 100 mol % of the (meth)acrylic copolymer, and the third structural unit derived from (meth)acrylamidosulfonic acid, (meth)acrylamidosulfonic acid salt, or a combination thereof may be included in an amount of 5 to 10 mol % based on 100 mol % of the (meth)acrylic copolymer.

The first structural unit derived from (meth)acrylamide may be represented by Chemical Formula 1, the second structural unit derived from (meth)acrylonitrile may be represented by Chemical Formula 2, and the third structural unit derived from (meth)acrylamidosulfonic acid, (meth)acrylamidosulfonic acid salt, or a combination thereof may be represented by one of Chemical Formula 3, Chemical Formula 4, Chemical Formula 5, and a combination thereof:

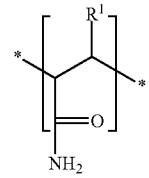

[Chemical Formula 1]

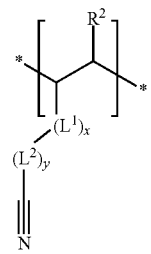

[Chemical Formula 2]

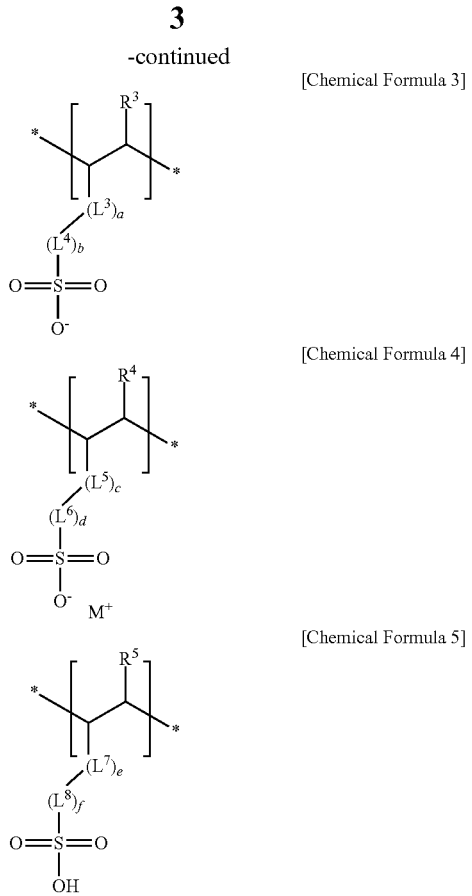

In Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(=O)—, —C(=O)O—, —OC(=O)—, —O—, or —C(=O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

The (meth)acrylic copolymer may have a weight average molecular weight of 200,000 to 700,000.

The (meth)acrylic copolymer may be included in an amount of 1 wt % to 5 wt % based on a total amount of the coating layer.

The coating layer may have a thickness of 1 μm to 5 μm.

The separator may have a moisture content of less than or equal to 800 ppm.

Another embodiment provides a lithium secondary battery including a positive electrode, a negative electrode, and the separator for a lithium secondary battery between the positive electrode and the negative electrode.

A lithium secondary battery including a separator for a lithium secondary battery having excellent heat resistance and adhesive strength may be implemented.

MODE FOR INVENTION

Figure 1:
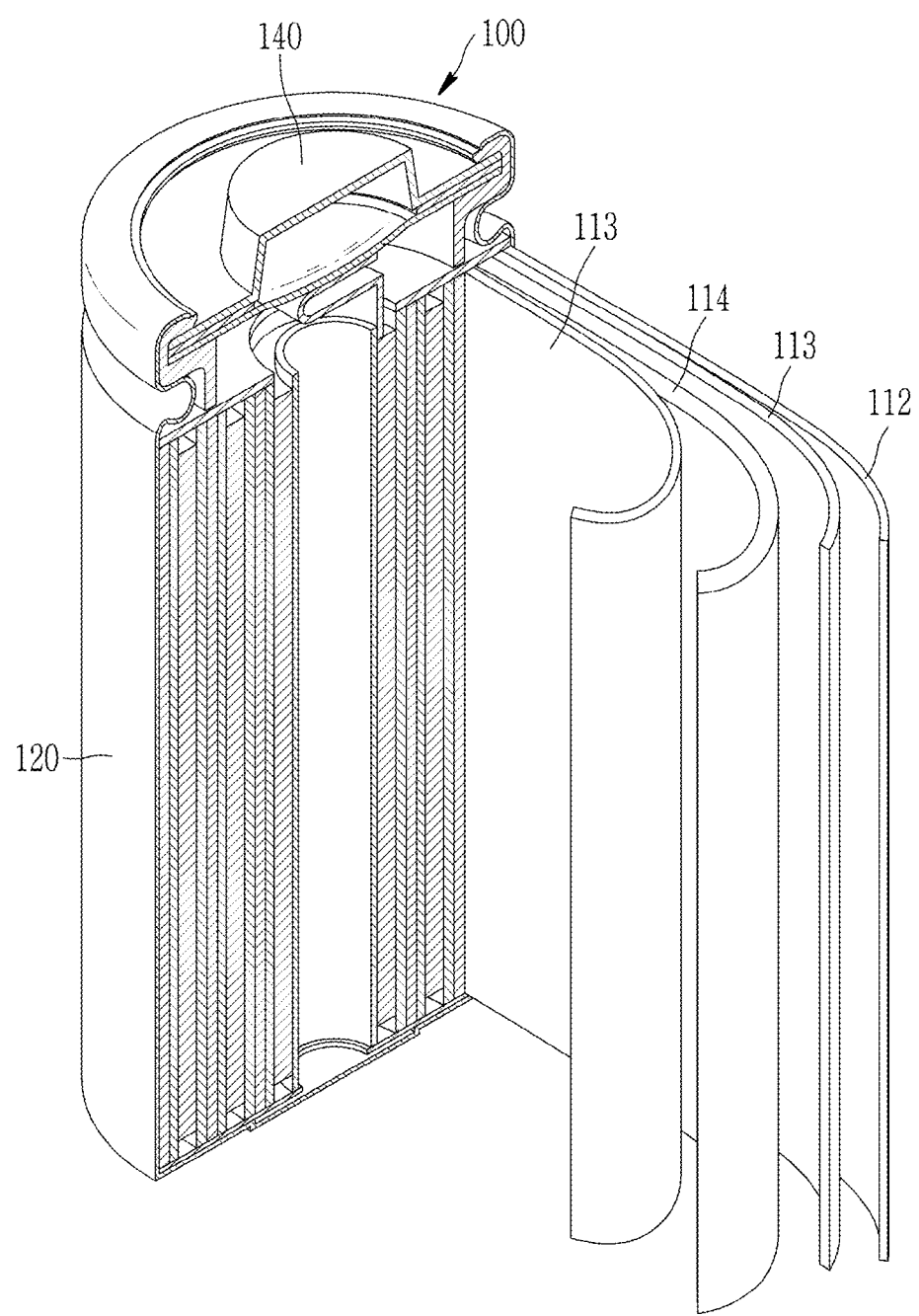
FIG. 1 is an exploded perspective view of a lithium secondary battery according to an embodiment.

Hereinafter, embodiments of the present invention are described in detail. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, "hetero" refers to one including 1 to 3 heteroatoms selected from N, O, S, and P.

In addition, in the present specification, when a definition is not otherwise provided, "heterocyclic group" refers to a substituted or unsubstituted C3 to C20 heterocycloalkylene group or a substituted or unsubstituted C6 to C20 heteroarylene group.

In addition, in the present specification, "(meth)acrylic" refers to acrylic or methacrylic.

A separator for a lithium secondary battery according an embodiment includes a porous substrate; and a coating layer on one surface or both surfaces of the porous substrate.

The porous substrate may have a plurality of pore and may generally be a porous substrate used in an electrochemical device. Non-limiting examples of the porous substrate may be a polymer film formed of a polymer selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene, or a copolymer or a mixture of two or more.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The coating layer according to an embodiment may be present on one surface of the substrate in contact with the positive electrode, on one surface of the substrate in contact with the negative electrode, or on both surfaces of the substrate in order to bind of the electrode and the separator. Accordingly, the interface resistance between the electrode and the separator may be reduced, and adhesive strength of the separator may be improved.

The coating layer according to an embodiment includes a (meth)acrylic copolymer including a first structural unit derived from (meth)acrylamide, a second structural unit derived from (meth)acrylonitrile, and a third structural unit derived from (meth)acrylamidosulfonic acid, (meth)acrylamidosulfonic acid salt, or a combination thereof.

The first structural unit derived from (meth)acrylamide includes an amide functional group (—NH$_2$) in the structural unit. The —NH$_2$ functional group may improve the adhesion properties of the porous substrate to the electrode, and by forming a hydrogen bond with the —OH functional group of the inorganic particles described later, the inorganic particles may be more firmly fixed in the coating layer and thus heat resistance may be enhanced.

The second structural unit derived from the (meth)acrylonitrile includes a nitrile group, thereby improving oxidation resistance of the separator and reducing the moisture content.

The third structural unit derived from (meth)acrylamidosulfonic acid, (meth)acrylamidosulfonic acid salt, or a combination thereof includes a bulky functional group, thereby reducing the mobility of the (meth)acrylic copolymer, the heat resistance of the separator may be enhanced.

The coating layer on the separator for a lithium secondary battery according to an embodiment includes two types of inorganic particles having different average particle diameters together with the aforementioned binder including the (meth)acrylic copolymer. The inorganic particles may prevent a separator from being sharply shrunk due to a temperature increase.

The shape of the inorganic particles according to an embodiment will be described with reference to FIG. 2.

Figure 2:
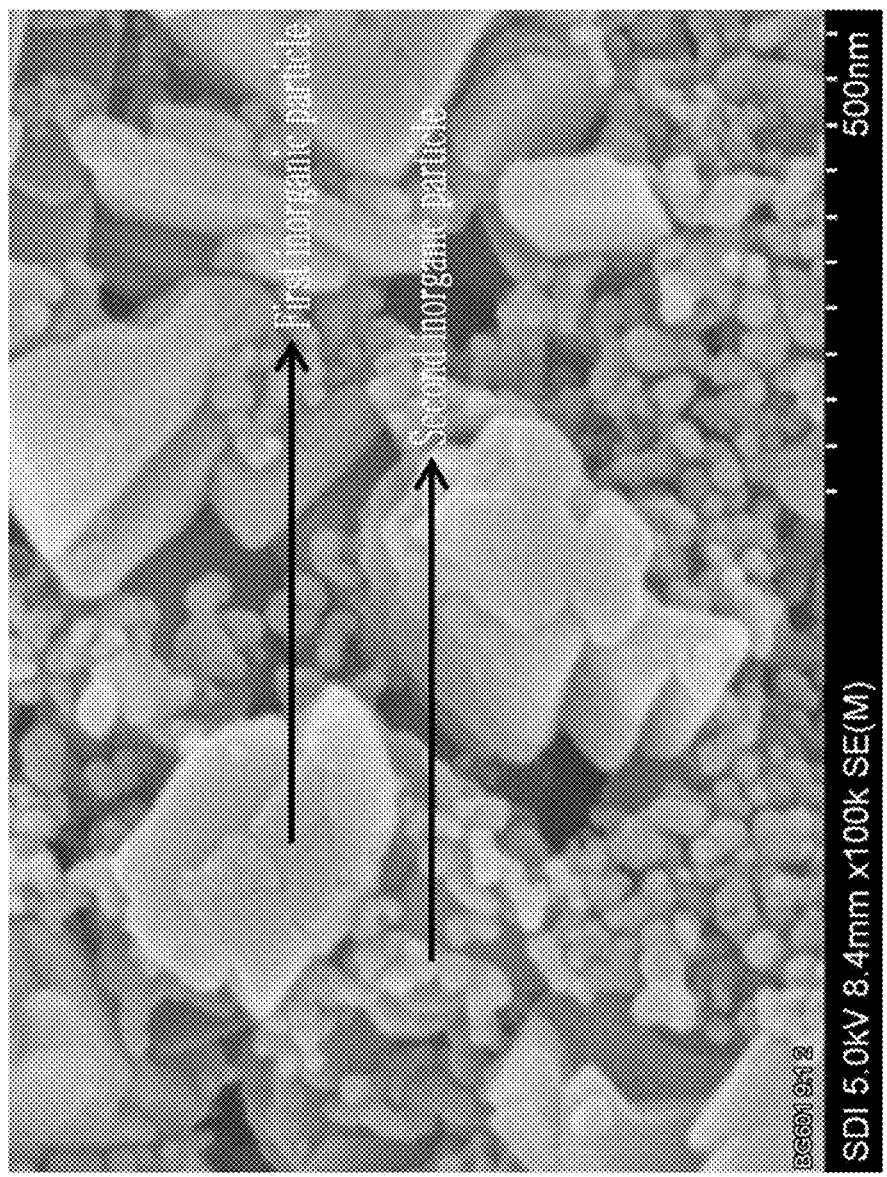
FIG. 2 is a SEM (Scanning Electron Microscope) measurement result of the separator prepared in Example 4.

FIG. 2 is a SEM (scanning electron microscope) measurement result of the separator prepared in Example 4.

Referring to FIG. 2, the inorganic particles may be a mixture of first inorganic particles having a relatively large average particle diameter and second inorganic particles having a relatively small average particle diameter.

The first inorganic particles may be large particle diameter inorganic particles having an average particle diameter of 400 nm to 600 nm, for example, 430 nm to 570 nm, 460 nm to 540 nm, or 480 nm to 520 nm.

The second inorganic particles may be small particle diameter inorganic particles having an average particle diameter of 50 nm to 200 nm, for example, 50 nm to 180 nm, 50 to 150 nm, or 80 nm to 120 nm.

The average particle diameter of the inorganic particles may be particle size (D50) at a volume ratio of 50% in a cumulative size-distribution curve.

Figure 3:
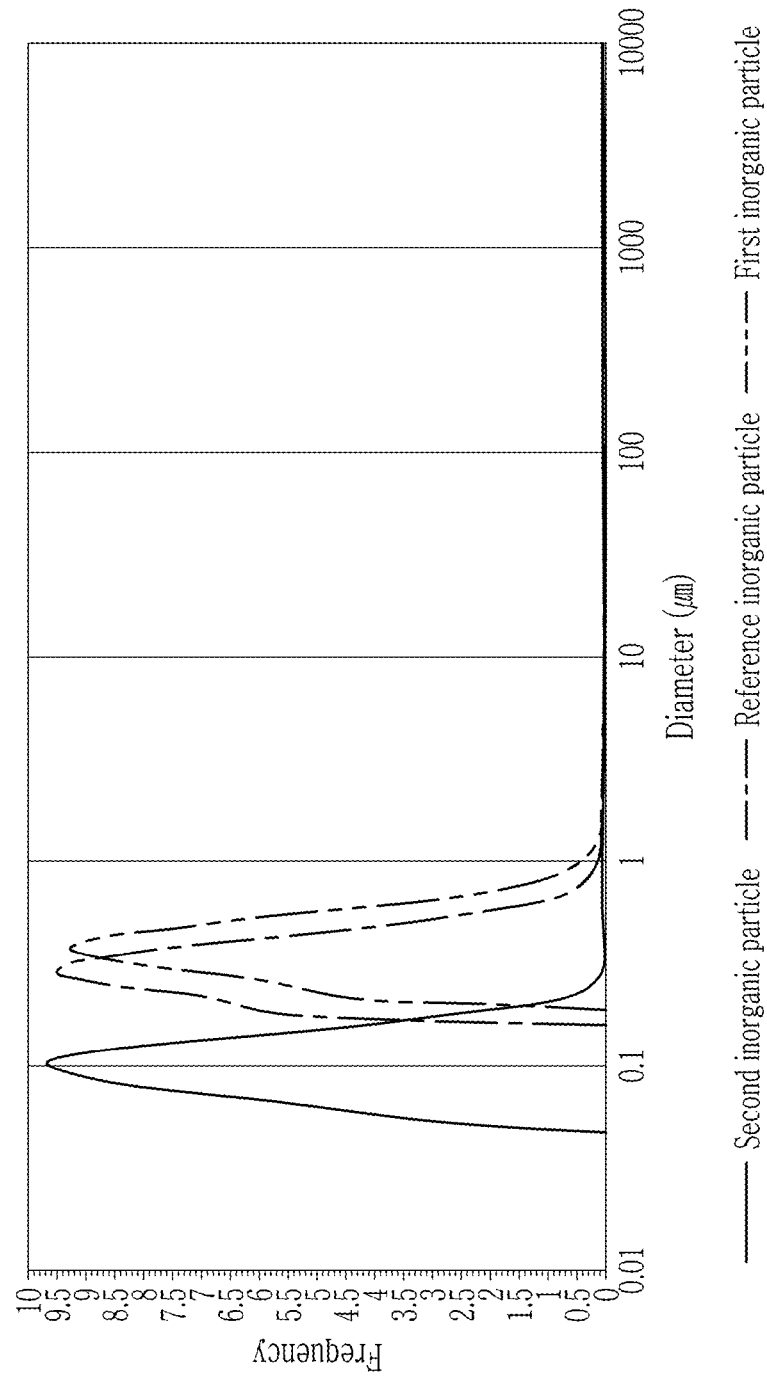
FIG. 3 is a graph showing a volume weighted particle size distribution curve of a composition for forming a coating layer of the separator prepared in Example 4.

FIG. 3 is a graph showing a volume weighted particle size distribution curve of a composition for forming a coating layer of a separator prepared in Example 4.

Referring to FIG. 3, the inorganic material according to an embodiment exists in a mixed form of particles having two types of average particle diameter.

The particle size distribution (PSD) of the inorganic particles according to an embodiment of the present invention may be measured using, for example, a laser diffraction method. Specifically, it may be measured by dispersing the inorganic particles in a solvent, introducing it into a commercially available laser diffraction particle size measuring device (for example, Microtrac S-3500), and irradiating an ultrasonic wave of about 28 kHz with an output of 60 W to apply a volume distribution weighted distribution method.

By including the first inorganic particles and the second inorganic particles together, inorganic particles having two types of average particle diameter may be mixed, and inorganic particles having a relatively small particle diameter may be included between inorganic particles having a relatively large particle diameter. Accordingly, a ratio of voids existing between inorganic particles may be reduced. As a result, since the packing density of the coating layer is increased, shrinkage due to heat is reduced when left at room temperature and high temperature, so that the high temperature stability of the battery may be increased. That is, by mixing the small particle diameter inorganic particles with the large particle diameter inorganic particles, heat resistance and moisture resistance as well as the substrate binding force of the separator may be improved, and thus the safety and cycle-life characteristics of the battery may be improved.

In particular, as the content of the second inorganic particles mixed with the first inorganic particles increases, the wet heat shrinkage rate and moisture content decrease, and particularly, when the second inorganic particles are included in an amount of less than 75 wt % based on the total amount of the first inorganic particles and the second inorganic particles, the wet heat shrinkage rate and the moisture content of the separator may be minimized.

The second inorganic particles may be included in an amount of less than 75 wt %, less than or equal to 70 wt %, less than or equal to 65 wt %, less than or equal to 60 wt %, less than or equal to 55 wt %, or less than or equal to 50 wt % and greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, or greater than or equal to 40 wt %, for example, less than 75 wt % or 20 wt % to 60 wt % based on the total amount of the first inorganic particles and the second inorganic particles.

That is, the wet heat shrinkage rate and moisture content, which showed a decreasing trend with the increase of the content of the second inorganic particles, increase again when the content of the second inorganic particles exceeds 60 wt %, and when the content of the second inorganic particles exceeds 75 wt %, the binding strength for the substrate decreases and as a result, the wet heat shrinkage rate also decreases.

Therefore, when the first inorganic particles and the second inorganic particles are included within the above range, binding strength for the substrate and heat resistance may be improved, and the residual moisture content of the separator after coating is reduced, thereby minimizing side reactions caused by residual moisture when applied to a lithium secondary battery.

According to an embodiment, a moisture content of the separator including the coating layer may be less than or equal to 800 ppm, for example less than or equal to 750 ppm, for example less than or equal to 730 ppm, and for example, 100 ppm to 720 ppm. When the moisture content in the separator is within the above ranges, the cycle-life characteristics of the battery may be improved by minimizing side reactions caused by moisture.

For example, a volume ratio of the first inorganic particles and the second inorganic particles may be 12:1 to 0.14:1, for example 3:1 to 0.56:1, 1.5:1 to 1.2:1, 1.5:1 to 1.3:1 or 1.4:1 to 1.2:1. When the volume ratio of the first inorganic particles and second inorganic particles is within the above ranges, the packing density of the coating layer increases and thus improved thermal stability may be achieved.

For example, the packing density of the coating layer including the first inorganic particles and second inorganic particles may be 1 to 1.5 g/μm, for example, 1.1 to 1.4 g/μm or 1.2 to 1.4 g/μm.

Herein, the packing density may be defined as follows.

Packing density (g/μm)=weight (g) of coating layer/thickness (μm) of coating layer The inorganic particles may be a ceramic material capable of improving heat resistance, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape, and the first inorganic particles and the second inorganic particles may be the same or different.

The coating layer may include the binder including the (meth)acrylic copolymer:a sum of the first inorganic particles and second inorganic particles in a weight ratio of 1:15 to 1:50, for example 1:20 to 1:40 or 1:20 to 1:30. When the (meth)acrylic copolymer and inorganic particles are included in the above ranges in the coating layer, the separator has excellent adhesive strength and heat resistance, in particular, an improved wet heat shrinkage, which directly affects actual battery performance.

The first structural unit may be included in an amount of 55 mol % to 90 mol %, for example 55 mol % to 85 mol % based on 100 mol % of the (meth)acrylic copolymer.

The second structural unit may be included in an amount of 5 mol % to 40 mol %, for example greater than or equal to 5 mol %, greater than or equal to 10 mol %, greater than or equal to 15 mol %, or greater than or equal to 20 mol %, and less than or equal to 40 mol %, less than or equal to 35 mol %, or less than or equal to 30 mol % based on 100 mol % of the (meth)acrylic copolymer.

The third structural unit may be included in an amount of 5 mol % to 40 mol %, for example greater than or equal to 5 mol % or greater than or equal to 10 mol %, and less than or equal to 40 mol %, less than or equal to 35 mol %, less than or equal to 30 mol %, less than or equal to 25 mol %, less than or equal to 20 mol %, less than or equal to 15 mol %, or less than or equal to 13 mol % based on 100 mol % of the (meth)acrylic copolymer.

For example, the first structural unit derived from (meth)acrylamide may be included in an amount of 80 to 85 mol % based on 100 mol % of the (meth)acrylic copolymer, the second structural unit derived from (meth)acrylonitrile may be included in an amount of 10 to 15 mol % based on 100 mol % of the (meth)acrylic copolymer, and the third structural unit derived from (meth)acrylamidosulfonic acid, (meth)acrylamidosulfonic acid salt, or a combination thereof may be included in an amount of 5 to 10 mol % based on 100 mol % of the (meth)acrylic copolymer. When the content of each structural unit is within the above ranges, heat resistance and adhesive strength of the separator may be further improved.

The first structural unit derived from the (meth)acrylamide may be, for example, represented by Chemical Formula 1.

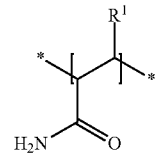

[Chemical Formula 1]

In Chemical Formula 1, $R^1$ is hydrogen or a C1 to C6 alkyl group.

The second structural unit derived from the (meth)acrylonitrile may be represented by Chemical Formula 2.

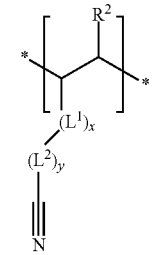

[Chemical Formula 2]

In Chemical Formula 2, $R^2$ is hydrogen or C1 to C3 alkyl group, $L^1$ is —C(=O)—, —C(=O)O—, —OC(=O)—, —O—, or —C(=O)NH—, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and x and y are each independently an integer of 0 to 2.

The second structural unit derived from the (meth)acrylonitrile may be, for example, a structural unit derived from (meth)acrylonitrile or cyanoalkyl (meth)acrylate. Herein, the alkyl may be a C1 to C20 alkyl, a C1 to C10 alkyl, or a C1 to C6 alkyl.

The cyanoalkyl (meth)acrylate may be, for example, cyanomethyl (meth) acrylate, cyanoethyl (meth) acrylate, cyanopropyl (meth) acrylate, or cyanooctyl (meth) acrylate.

The structural unit derived from the (meth)acrylamidosulfonic acid, (meth)acrylamidosulfonic acid salt, or a combination thereof may be a structural unit derived from (meth)acrylamidosulfonic acid or (meth)acrylamidosulfonate and the (meth)acrylamidosulfonate may be a conjugate base of (meth)acrylamidosulfonic acid, (meth)acrylamidosulfonic acid salt, or a derivative thereof. The structural unit derived from the (meth)acrylamidosulfonic acid or (meth)acrylamidosulfonate may be, for example, represented by one of Chemical Formula 3, Chemical Formula 4, Chemical Formula 5, and a combination thereof.

[Chemical Formula 3]

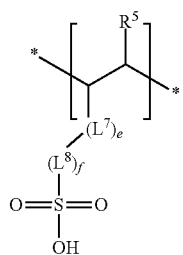

[Chemical Formula 4]

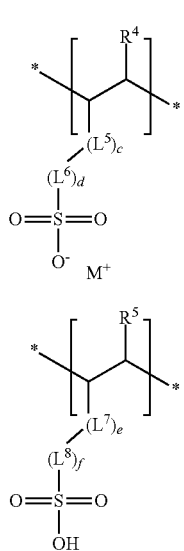

[Chemical Formula 5]

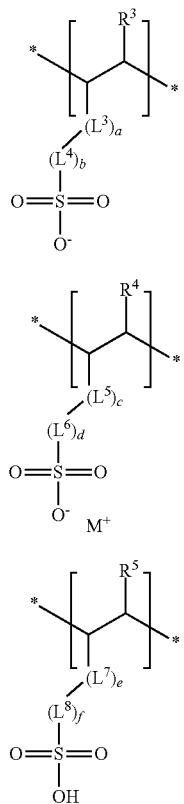

In Chemical Formula 3 to Chemical Formula 5, $R^3$, $R^4$, and $R^5$ are each independently hydrogen or a C1 to C3 alkyl group, $L^3$, $L^5$, and $L^7$ are each independently —C(=O)—, —C(=O)O—, —OC(=O)—, —O—, or —C(=O)NH—, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, c, d, e, and f are each independently an integer of 0 to 2, and M is an alkali metal, wherein the alkali metal may be, for example, lithium, sodium, potassium, rubidium, or cesium.

For example, in Chemical Formula 3 to Chemical Formula 5, $L^3$, $L^5$, and $L^7$ may all be —C(=O)NH—, $L^4$, $L^6$, and $L^8$ may each independently be a substituted or unsubstituted C1 to C10 alkylene, and a, b and c may each be 1.

The third structural unit derived from the (meth)acrylamidosulfonic acid, (meth)acrylamidosulfonic acid salt, or a combination thereof may include each of the structural unit represented by Chemical Formula 3, the structural unit represented by Chemical Formula 4, and the structural unit represented by Chemical Formula 5, or may include two or more types thereof together. As one example, the structural unit represented by Chemical Formula 4 may be included, and as another example, the structural unit represented by Chemical Formula 4 and the structural unit represented by Chemical Formula 5 may be included together.

When the structural unit represented by Chemical Formula 4 and the structural unit represented by Chemical Formula 5 are included together, the structural unit represented by Chemical Formula 4 and the structural unit represented by Chemical Formula 5 may be included in a mole ratio of 10:1 to 1:2, for example 5:1 to 1:1, or 3:1 to 1:1.

The sulfonate group in the third structural unit derived from the (meth)acrylamidosulfonic acid, (meth)acrylamidosulfonic acid salt, or a combination thereof may be, for example, a functional group derived from vinyl sulfonic acid, allyl sulfonic acid, styrene sulfonic acid, anethol sulfonic acid, acrylamidoalkane sulfonic acid, sulfoalkyl (meth)acrylate, or a salt thereof.

Herein, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The salt refers to a salt composed of the aforementioned sulfonic acid and appropriate ions. The ions may be, for example, alkali metal ions, and in this case, the salt may be an alkali metal sulfonate salt.

The acrylamidoalkane sulfonic acid may be, for example, 2-acrylamido-2-methylpropane sulfonic acid and the sulfoalkyl (meth)acrylate may be, for example, 2-sulfoethyl (meth)acrylate, 3-sulfopropyl (meth)acrylate, and the like.

The (meth)acrylic copolymer may be represented by Chemical Formula 6.

[Chemical Formula 6]

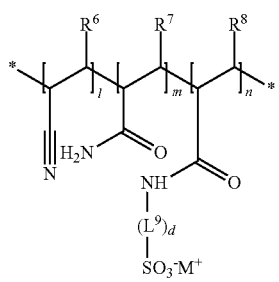

In Chemical Formula 6, $R^6$ to $R^8$ are each independently hydrogen or a methyl group, $L^9$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, M is an alkali metal such as lithium, sodium, potassium, rubidium, or cesium, and l, m, and n indicate mole ratios of each unit.

For example, in Chemical Formula 6, l+m+n may be 1. In addition, for example, it may be $0.10 \leq (l+n) \leq 0.45$, $0.55 \leq m \leq 0.90$, specifically $0.05 \leq l \leq 0.4$ and $0.05 \leq n \leq 0.4$, for example $0.55 \leq m \leq 0.85$, $0.1 \leq l \leq 0.4$, and $0.05 \leq n \leq 0.1$.

The structural unit in which the alkali metal ($M^+$) is substituted in the (meth)acrylic copolymer may be present in an amount of 50 to 100 mol %, for example 60 to 90 mol %, or 70 to 90 mol % based on 100 mol % of the total amount of the (meth)acrylamidosulfonic acid structural unit. When the above range is satisfied, the (meth)acrylic copolymer and the separator including the same may exhibit excellent adhesive strength, heat resistance, and oxidation resistance.

The (meth)acrylic copolymer may further include other structural units in addition to the structural units described above. For example, the (meth)acrylic copolymer may further include a structural unit derived from an alkyl (meth)acrylate, a structural unit derived from a diene-based compound, a structural unit derived from a styrene-based compound, a structural unit containing an ester group, a structural unit containing a carbonate group, or a combination thereof.

The (meth)acrylic copolymer may be in various forms, such as an alternating polymer in which the structural units are alternately distributed, a random polymer randomly distributed, or a graft polymer in which some structural units are grafted.

The weight average molecular weight of the (meth)acrylic copolymer may be 200,000 to 700,000, for example greater than or equal to 200,000, greater than or equal to 210,000, greater than or equal to 220,000, greater than or equal to 230,000, greater than or equal to 240,000, greater than or equal to 250,000, greater than or equal to 260,000, greater than or equal to 270,000, greater than or equal to 280,000, greater than or equal to 290,000, greater than or equal to 300,000, greater than or equal to 330,000, greater than or equal to 360,000, greater than or equal to 390,000, greater than or equal to 400,000, or greater than or equal to 410,000, and less than or equal to and 700,000, less than or equal to 690,000, less than or equal to 680,000, less than or equal to 670,000, less than or equal to 660,000, less than or equal to 650,000, less than or equal to 640,000, less than or equal to 630,000, less than or equal to 620,000, less than or equal to 610,000, less than or equal to 600,000, less than or equal to 590,000, less than or equal to 570,000, less than or equal to 550,000, less than or equal to 530,000, less than or equal to 510,000, less than or equal to 500,000, or less than or equal to 490,000. When the weight average molecular weight of the (meth)acrylic copolymer satisfies the above ranges, the (meth)acrylic copolymer and a separator including the (meth)acrylic copolymer may have excellent adhesive strength, heat resistance, and air permeability.

The weight average molecular weight may be polystyrene-reduced average molecular weight measured by gel permeation chromatography.

The (meth)acrylic copolymer may be prepared by various methods such as emulsion polymerization, suspension polymerization, massive polymerization, solution polymerization, or bulk polymerization.

The (meth)acrylic copolymer may have a glass transition temperature of 150° C. to 180° C., for example, 155° C. to 180° C., 160° C. to 180° C., or 165° C. to 180° C. When the glass transition temperature of the (meth)acrylic copolymer falls within the above ranges, the (meth)acrylic copolymer and a separator including the same may have excellent adhesive strength, heat resistance, and air permeability.

The binder including the (meth)acrylic copolymer may be included in an amount of 1 to 5 wt %, for example, 2 to 4 wt % based on a total amount of the coating layer. When the content ratio of the (meth)acrylic copolymer satisfies the above ranges, the (meth)acrylic copolymer and a separator including the same may exhibit excellent adhesive strength, heat resistance, and air permeability.

Meanwhile, the coating layer may further include a crosslinked binder having a crosslinked structure in addition to the binder including the (meth)acrylic copolymer. The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof but is not limited thereto.

The crosslinked binder may be for example, obtained by curing a monomer, an oligomer and/or a polymer including at least two (meth)acrylate groups, and may be for example obtained by curing ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri (meth)acrylate, pentaerythritol tetra(meth)acrylate, diglycerine hexa(meth)acrylate, or a combination thereof.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyl-diphenyl-4,4'-diisocyanate, xylene diisocyanate, naphthalene diisocyanate, 1,4-cyclohexyl diisocyanate, or a combination thereof.

In addition, the coating layer may further include a non-crosslinked binder in addition to the binder including the (meth)acrylic copolymer. The non-crosslinked binder may be for example a vinylidenefluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-crosslinked binder may be a polyvinylidene fluoride (PVdF) homopolymer, a polyvinylidene fluoride-hexafluoropropylene (PVdF-HFP) copolymer, or a combination thereof. In this case, adhesive strength between the porous substrate and the coating layer is increased, stability of the separator and impregnation properties of an electrolyte solution are improved, and thus high-rate charge and discharge characteristics of a battery is improved.

The coating layer may have a thickness of about 1 μm to 5 μm, for example 1.5 μm to 3 μm.

A ratio of a thickness of the coating layer to a thickness of the porous substrate may be 0.05 to 0.5, for example 0.05 to 0.4, or 0.05 to 0.3, or 0.1 to 0.2. In this case, the separator including the porous substrate and the coating layer may exhibit excellent air permeability, heat resistance, and adhesive strength.

The separator for a lithium secondary battery according to an embodiment has excellent heat resistance. Specifically, the separator may have a dry heat shrinkage rate of less than 10%, less than or equal to 9%, less than or equal to 8%, less than or equal to 7%, less than or equal to 6%, less than or equal to 5%, less than or equal to 4%, less than or equal to 3%, or less than or equal to 2.5% in the longitudinal and transverse directions at high temperature and may have a wet heat shrinkage rate of less than or equal to 25%, less than or equal to 24%, less than or equal to 23%, less than or equal to 22%, less than or equal to 21%, less than or equal to 20%, less than or equal to 19%, less than or equal to 18%, less than or equal to 17%, less than or equal to 16%, less than or equal to 15%, less than or equal to 14%, less than or equal to 13%, less than or equal to 12%, less than or equal to 11%, or less than or equal to 10%.

The separator for a lithium secondary battery according to an embodiment may exhibit excellent air permeability, and specifically less than 160 sec/100 cc·1 µm, for example less than or equal to 150 sec/100 cc·1 µm, or less than or equal to 140 sec/100 cc·1 µm per unit thickness. Herein, the air permeability refers to the time (seconds) it takes for 100 cc of air to pass through the unit thickness of the separator. The air permeability per unit thickness may be obtained by measuring the air permeability for the total thickness of the separator and dividing it by the thickness.

The separator for a lithium secondary battery according to an embodiment may be manufactured by known various methods. For example, the separator for a lithium secondary battery may be formed by coating a composition for forming a coating layer on one surface or both surfaces of the porous substrate and drying the same.

The composition for forming the coating layer may include the binder including the (meth)acrylic copolymer, first inorganic particles, second inorganic particles, and a solvent. The solvent is not particularly limited if the solvent may dissolve or disperse the binder including the (meth) acrylic copolymer and the inorganic particles. In an embodiment, the solvent may be an aqueous solvent including water, an alcohol, or a combination thereof, which is environmentally-friendly.

The coating may be, for example spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present invention is not limited thereto. The drying may be for example performed at a temperature of 25° C. to 120° C.

The separator for a lithium secondary battery may be manufactured by lamination, coextrusion, and the like besides the above method.

Hereinafter, a lithium secondary battery including the aforementioned separator for a lithium secondary battery is described.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is for example described.

FIG. 1 is an exploded perspective view of a lithium secondary battery according to an embodiment.

Referring to FIG. 1, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114, and the separator 113, a battery case 20 housing the battery cell, and a sealing member 140 sealing the battery case.

The positive electrode 114 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shaped, flake-shaped, spherically shaped, or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. The organic solvent may for example be a carbonate-based solvent, an ester-based solvent, an ether-based solvent, a ketone-based solvent, an alcohol-based solvent, or an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Hereinafter, the above aspects of the present invention are illustrated in more detail with reference to examples. However, these examples are exemplary, and the present invention is not limited thereto.

SYNTHESIS EXAMPLE: SYNTHESIS OF ACRYLIC COPOLYMER

Synthesis Example 1: AM/AN/AMPS=85/10/5, Weight Average Molecular Weight: 410,000, Glass Transition Temperature: 165° C.

Distilled water (6,361 g), acrylamide (604.2 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent (1.05 g)) based on a total amount (0.5 mol) of 2-acrylamido-2-methylpropanesulfonic acid) were added to a 10 L four-necked flask equipped with a stirrer, a thermometer, and a cooling tube, and after three times repeating an operation of reducing the internal pressure to 10 mmHg with a diaphragm pump and then, returning it to a normal pressure with nitrogen, acrylonitrile (53.1 g, 1.0 mol) was added thereto.

A reaction was performed for 12 hours, while adjusting the temperature of the reaction solution to be stabilized between 55° C. and 60° C., and cooled to room temperature.

By this method, poly(acrylamide-co-acrylonitrile-co-2-acrylamido-2-methylpropanesulfonic acid) lithium salt was prepared. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

On the other hand, AM is acrylamide, AN is acrylonitrile, and AMPS is 2-acrylamido-2-methylpropanesulfonic acid.

EXAMPLES: MANUFACTURE OF SEPARATOR FOR LITHIUM SECONDARY BATTERY

Example 1

Inorganic particles were prepared by mixing the first inorganic particles (boehmite, manufactured by Anhui Estone, average particle diameter 500 nm) and the second inorganic particles (alumina, manufactured by Evonik, average particle diameter: 100 nm) at a weight ratio of 90:10. The acrylic copolymer prepared in Synthesis Example 1 (10 wt % in distilled water) and the inorganic particles (first inorganic particles:second inorganic particles=a weight ratio of 90:10) were mixed in a weight ratio of 1:25 and added to a water solvent to prepare organic-inorganic dispersion by milling and dispersing at 25° C. for 30 minutes using a bead mill.

Subsequently, water was added thereto so that a total solid content might be 25 wt % to prepare a composition for a coating layer. The composition was coated to be 3 μm thick on a 8 μm-thick polyethylene porous substrate (air permeability: 120 sec/100 cc, puncture strength: 480 kgf, SK global chemical Co., Ltd.) by a bar-coating method and then, dried at 70° C. for 10 minutes to manufacture a separator for a lithium secondary battery.

Example 2

A separator for a secondary battery was manufactured in the same manner as in Example 1, except that inorganic particles obtained by mixing the first inorganic particles and the second inorganic particles at a weight ratio of 75:25 were added.

Example 3

A separator for a secondary battery was manufactured in the same manner as in Example 1, except that inorganic particles obtained by mixing the first inorganic particles and the second inorganic particles at a weight ratio of 60:40 were added.

Example 4

A separator for a secondary battery was manufactured in the same manner as in Example 1, except that inorganic particles obtained by mixing the first inorganic particles and the second inorganic particles at a weight ratio of 50:50 were added.

Example 5

A separator for a secondary battery was manufactured in the same manner as in Example 1, except that inorganic particles obtained by mixing the first inorganic particles and the second inorganic particles at a weight ratio of 40:60 were added.

Example 6

A separator for a secondary battery was manufactured in the same manner as in Example 1, except that inorganic particles obtained by mixing the first inorganic particles and the second inorganic particles at a weight ratio of 25:75 were added.

Example 7

A separator for a secondary battery was manufactured in the same manner as in Example 1, except that inorganic particles obtained by mixing the first inorganic particles and the second inorganic particles at a weight ratio of 10:90 were added.

Comparative Example 1

A separator for a secondary battery was prepared in the same manner as in Example 1, except that the second inorganic particles were not added (the first inorganic particles:the second inorganic particles=100:0 by weight).

Comparative Example 2

A separator for a secondary battery was prepared in the same manner as in Example 1, except that the first inorganic particles were not added (the first inorganic particles:the second inorganic particles=0:100 by weight).

Example 8

Inorganic particles were prepared by mixing the first inorganic particles (boehmite, manufactured by Anhui Estone, average particle diameter: 500 nm) and the second inorganic particles (alumina, manufactured by Evonik, average particle diameter: 100 nm) in a weight ratio of 50:50. The inorganic particles (first inorganic particles:second inorganic particles=weight ratio of 50:50) were added to the acrylic copolymer prepared in Synthesis Example 1 (10 wt % in distilled water) in a water solvent at a weight ratio of 1:25 to prepare organic-inorganic dispersion by milling and dispersing at 25° C. for 30 minutes using a bead mill.

Subsequently, water was added thereto so that a total solid content might be 20 wt % to prepare a composition for a coating layer. The composition was coated to be 3-μm thick on both surfaces of a 8 μm-thick polyethylene porous substrate (air permeability: 120 sec/100 cc, puncture strength: 480 kgf, SK global chemical Co., Ltd.) by a by a die coating method and then, dried at 70° C. for 10 minutes to manufacture a separator for a lithium secondary battery.

Comparative Example 3

A separator for a secondary battery was prepared in the same manner as in Example 8, except that the second inorganic particles were not added (the first inorganic particles:the second inorganic particles=100:0 by weight).

Comparative Examples 4 to 8

A separator for a secondary battery was prepared in the same manner as in Example 1, except that the acrylic copolymers shown in Table 2 were used instead of the acrylic copolymer prepared in Synthesis Example 1.

Comparative Examples 9 to 13

Third-party coating separator prototypes described in Table 2 were used.

Evaluation Example 1: SEM (Scanning Electron Microscope) Photograph

A SEM photograph of the separator according to Example 4 was taken, and the result is shown in FIG. 2.

Referring to FIG. 2, the separator according to Example 4 exhibited that two types of inorganic particles having different average particle diameters were mixed.

Evaluation Example 2: Particle Distribution of Inorganic Particles

The composition for a coating layer used to form the separator of Example 4 was measured with respect to a particle distribution curve of the inorganic particles, and the result is shown in FIG. 3.

On the other hand, the particle distribution curve of the inorganic particles was measured by applying a volume distribution weighted distribution method to the composition for a coating layer at room temperature and using S-3500 made by Microtrac Retsch GmbH.

Referring to FIG. 3, the separator of Example 4 exhibited that two types of the inorganic particles having different average particle diameters were mixed.

Evaluation Example 3: Adhesive Strength to Substrate

The separators according to Examples 1 to 8 and Comparative Examples 1 to 3 were respectively cut into a size having a width of 12 mm and a length of 50 mm to prepare each sample. After adhering a tape to the coating layer surface of each sample, separating the tape-adhered surface from the substrate about 10 mm to 20 mm apart, and then, clipping the substrate having no tape with an upper grip, the coating layer surface adhered with the tape with a lower grip, and fixing a distance between the grips into 20 mm, the coating layer was pulled toward a direction of 180° and peeled off from each separator. Herein, strength for peeling off up to 40 mm at a peeling speed of 10 mm/min was three times measured and averaged. The peeling strength results are shown in Table 1.

Evaluation Example 4: Heat Shrinkage Rate (Dry Heat Shrinkage Rate)

The separators for a lithium secondary battery according to Example 1 to 8 and Comparative Examples 1 to 13 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven, and each shrinkage rate between machine direction (MD) and in a traverse direction (TD) was calculated by measuring sides of the quadrangles on the samples. The results are shown in Tables 1 and 2.

(Wet Heat Shrinkage Rate)

The separators for a lithium secondary battery according to Examples 1 to 8 and Comparative Examples 1 to 13 were respectively cut into a size of 5 cm×5 cm to prepare samples. The samples were inserted into polyethylene terephthalate release papers and were put in an aluminum pouch with 2 g of electrolyte, and sealed, and then after being left in an oven at 150° C. for 1 hour, the samples were taken out and the horizontal and vertical dimensions were measured to calculate each shrinkage rate in a machine direction (MD) and a traverse direction (TD). The results are shown in Tables 1 and 2.

Figure 4:
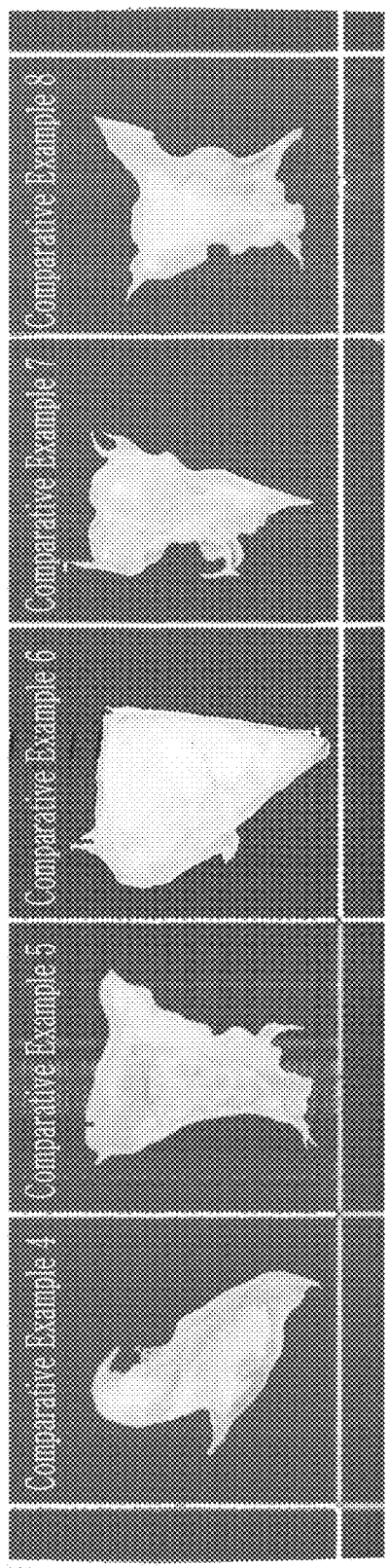
FIG. 4 is photographs showing change results after wet shrinkage of the single-surface coated separators prepared in Comparative Examples 4 to 8.
Figure 5:
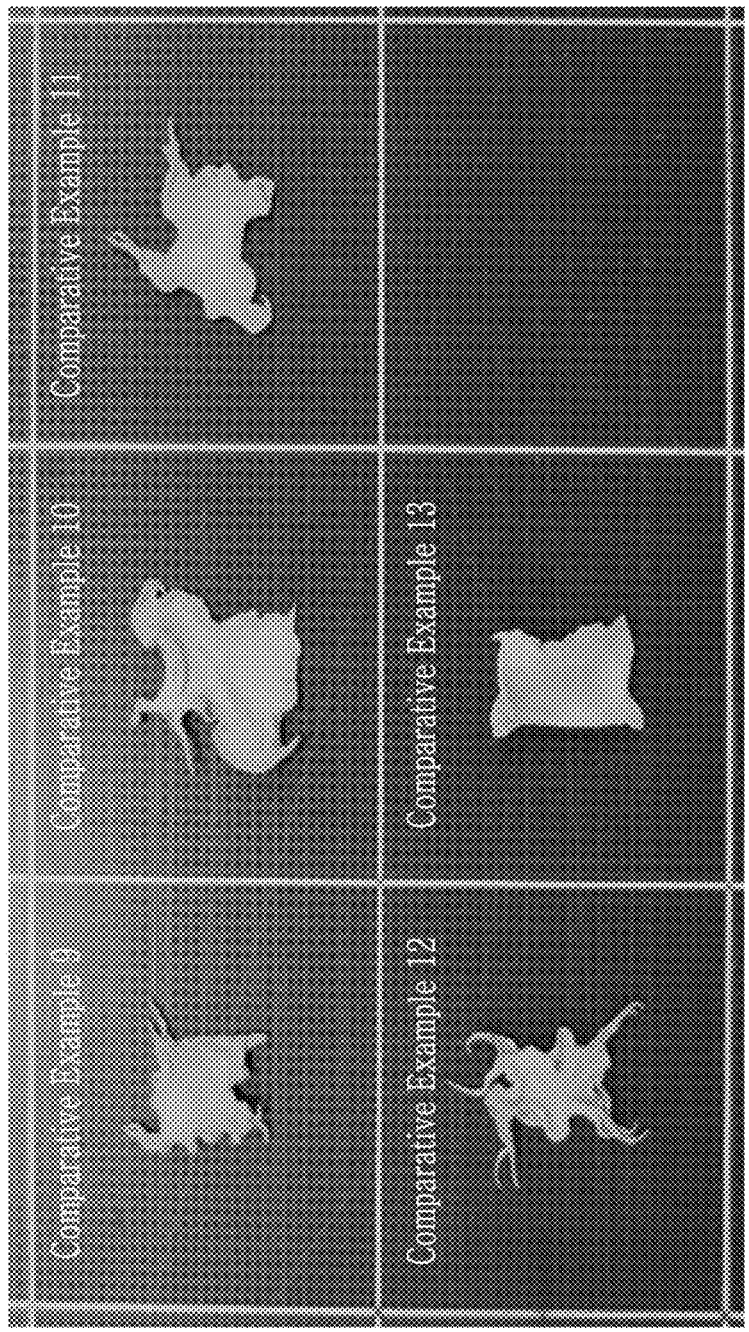
FIG. 5 is photographs showing change results after wet shrinkage of the single-surface coated separators prepared in Comparative Examples 9 to 13.
Figure 6:
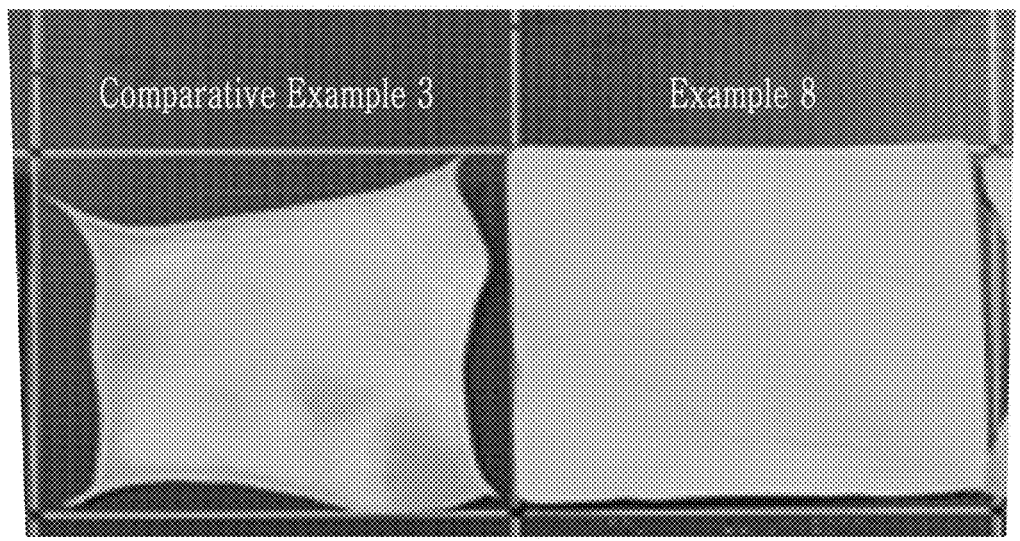
FIG. 6 is photographs showing change results after wet shrinkage of the both-surfaces coated separator prepared in Example 8 and Comparative Example 3.

FIGS. 4 and 5 are photographs showing change results after performing wet heat shrinkage of each of the single-surface coated separators prepared in Comparative Examples 4 to 13 and FIG. 6 is a photograph showing a change result after performing wet heat shrinkage of each of the both-surfaces coated separators prepared in Comparative Examples 3 and 8.

Referring to FIGS. 4 to 6, the separators including the acrylic copolymer of Synthesis Example 1 and two types of inorganic particles having different average particle diameters according to an embodiment exhibited greatly improved heat shrinkage rates.

Evaluation Example 5: Evaluation of Moisture Content of Separator

The moisture contents of the separators for a lithium secondary battery according to Examples 1 to 8 and Comparative Examples 1 to 3 were evaluated using a Karl Fisher method, and the results are shown in Table 1.

TABLE 1

| Coating surface | | Binder:inorganic material (weight ratio) 1:25 First inorganic particles:second inorganic particles (weight ratio) | Thickness of coating layer (μm) | Adhesive strength to substrate (gf) | Dry heat shrinkage rate 150° C. 1 hr MD (%) | Dry heat shrinkage rate 150° C. 1 hr TD (%) | Wet heat shrinkage rate 150° C. 1 hr MD (%) | Wet heat shrinkage rate 150° C. 1 hr TD (%) | Moisture content (ppm) |
|---|---|---|---|---|---|---|---|---|---|
| Single surface | Ex. 1 | 90:10 | 3 | 11.2 | 1.5 | 1.7 | 20 | 20 | 455 |
| | Ex. 2 | 75:25 | 3 | 12.1 | 1.4 | 1.5 | 18 | 19 | 393 |
| | Ex. 3 | 60:40 | 3 | 12.6 | 1.3 | 1.6 | 15 | 15 | 472 |
| | Ex. 4 | 50:50 | 3 | 13.7 | 1.1 | 1.6 | 10 | 10 | 491 |
| | Ex. 5 | 40:60 | 3 | 12.3 | 1.1 | 1.4 | 18 | 19 | 725 |
| | Ex. 6 | 25:75 | 3 | 12.4 | 1.4 | 2.3 | 26 | 25 | 902 |
| | Ex. 7 | 10:90 | 3 | 11.5 | 1.6 | 1.9 | 28 | 25 | 1,105 |
| | Comp. Ex. 1 | 100:0 | 3 | 10.1 | 1.2 | 1.2 | 21 | 22 | 325 |
| | Comp. Ex. 2 | 0:100 | 3 | 10.2 | 1.8 | 1.7 | 25 | 31 | 1,610 |
| Both surfaces | Ex. 8 | 50:50 | 3 | 15.6 | 0.7 | 0.7 | 6 | 6 | 521 |
| | Comp. Ex. 3 | 100:0 | 3 | 14.5 | 1.0 | 1.0 | 16 | 18 | 1,885 |

Referring to Table 1, the separators including a bimodal system inorganic material (including the first inorganic particles and the second inorganic particle) according to Examples 1 to 8 had excellent adhesive strength to the substrate and simultaneously, exhibited a greatly improved wet heat shrinkage rate having an influence on actual cell characteristics, when the first inorganic particles and the second inorganic particles were mixed in a specific ratio.

In other words, referring to Table 1, the separators including a bimodal system inorganic material according to Examples 1 to 8 had excellent adhesive strength to the substrate, and in particular, the separators including greater than or equal to 10 wt % and less than or equal to 60 wt % of the second inorganic particles based on a total amount of the first and second inorganic particles according to Examples 1 to 5 and Example 8 exhibited a greatly improved wet heat shrinkage rate, which is a heat shrinkage rate in an electrolyte solution, and also a greatly improved moisture content, and accordingly, heat resistance may be expected to be greatly improved, when applied in actual cells.

TABLE 2

|  | Type of binder (structural unit mol %) | Thickness of coating layer (μm) | Dry heat shrinkage rate 150° C., 1 hr | | Wet heat shrinkage rate 150° C., 1 hr | |
|---|---|---|---|---|---|---|
|  |  |  | MD (%) | TD (%) | MD (%) | TD (%) |
| Ex. 2 | Synthesis Example 1 | 3 | 1.4 | 1.5 | 18 | 19 |
| Comp. Ex. 4 | AA(20)/CMC(80) | 3 | 4.9 | 5.0 | 46 | 47 |
| Comp. Ex. 5 | AA(30)/VP(70) | 3 | 1.3 | 1.7 | 45 | 45 |
| Comp. Ex. 6 | AA(40)/CMC(30)/VP(30) | 3 | 1.3 | 2.0 | 38 | 40 |
| Comp. Ex. 7 | AA(50)/VA(50) | 3 | 1.1 | 1.5 | 47 | 51 |
| Comp. Ex. 8 | AA(100) | 3 | 1.3 | 1.5 | 50 | 54 |
| Comp. Ex. 9 | separator tradename: SC1230 (manufacturer: WSK) | 3 | 5.8 | 5.8 | 71 | 72 |
| Comp. Ex. 10 | separator tradename: SC1230P1 (manufacturer: WSK) | 3 | 1.4 | 1.8 | 65 | 57 |
| Comp. Ex. 11 | separator tradename: SC0930 (manufacturer: WSK) | 3 | 1.9 | 2.8 | 62 | 68 |
| Comp. Ex. 12 | separator tradename: CW151338 (manufacturer: CZMZ) | 3 | 1.9 | 1.9 | 66 | 63 |
| Comp. Ex. 13 | separator tradename: CW121338 (manufacturer: CZMZ) | 3 | 1.8 | 1.6 | 75 | 60 |

Referring to Table 2, the separator including an acrylic copolymer according to Example 2 exhibited equivalent dry heat shrinkage rates to those of comparative examples but greatly improved wet heat shrinkage rates, which are heat shrinkage rates in an electrolyte solution, and accordingly, the separators may exhibit a large heat resistance difference, when applied to actual cells.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: lithium secondary battery
112: negative electrode
113: separator
114: positive electrode
120: battery case
140: sealing member

The invention claimed is:

1. A separator for a lithium secondary battery, comprising a porous substrate and a coating layer on at least one surface of the porous substrate,
wherein the coating layer comprises
a binder including a (meth)acrylic copolymer of a first structural unit derived from (meth)acrylamide, a second structural unit derived from (meth)acrylonitrile, and a third structural unit derived from (meth)acrylamidosulfonic acid, (meth)acrylamidosulfonic acid salt, or a combination thereof, and wherein the first structural unit derived from (meth)acrylamide is represented by Chemical Formula 1, the second structural unit derived from (meth)acrylonitrile is represented by Chemical Formula 2, and the third structural unit derived from (meth)acrylamidosulfonic acid, (meth)acrylamidosulfonic acid salt, or a combination thereof is represented by one of Chemical Formula 3, Chemical Formula 4, Chemical Formula 5, and a combination thereof:

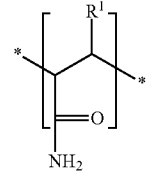

[Chemical Formula 1]

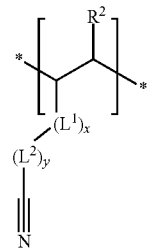

[Chemical Formula 2]

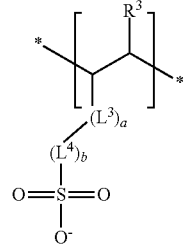

[Chemical Formula 3]

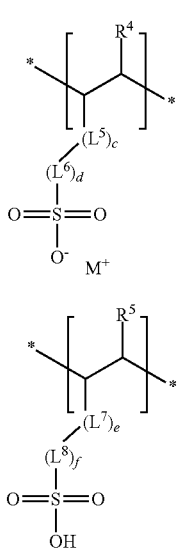

[Chemical Formula 4]

[Chemical Formula 5]

wherein, in Chemical Formula 1 to Chemical Formula 5,
$R^1$ is hydrogen or a methyl group,
$R^2$, $R^3$, $R^4$ and $R^5$ are each independently hydrogen or a C1 to C3 alkyl group,
$L^1$, $L^3$, $L^5$ and $L^7$ are each independently —C(=O)—, —C(=O)O—, —OC(=O)—, —O—, or —C(=O)NH—,
$L^2$, $L^4$, $L^6$ and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
x and y are each independently an integer of 0 to 2,
a, b, c, d, e, and f are each independently an integer of 0 to 2, and $M^+$ is an alkali metal;
first inorganic particles; and
second inorganic particles;
wherein the average diameter of the first inorganic particles is 400 nm to 600 nm, the average diameter of the second inorganic particles is smaller than the average diameter of the first inorganic particles, and the second inorganic particles are included in an amount of 30 wt. % to 60 wt. % based on the total amount of the first inorganic particles and the second inorganic particles.

2. The separator of claim 1, wherein the second inorganic particles have an average particle diameter (D50) of 50 nm to 200 nm.

3. The separator of claim 1, wherein a volume ratio of the first inorganic particles and the second inorganic particles is 1.4:1 to 1.2:1.

4. The separator of claim 1, wherein the first inorganic particles and the second inorganic particles may each independently include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and a combination thereof.

5. The separator of claim 1, wherein a weight ratio the binder:a sum of the first inorganic particles and second inorganic particles is 1:15 to 1:50.

6. The separator of claim 1, wherein the (meth)acrylic copolymer has a glass transition temperature of 150° C. to 180° C.

7. The separator of claim 1, wherein the first structural unit is included in an amount of 55 mol % to 90 mol % based on 100 mol % of the (meth)acrylic copolymer and the second structural unit and third structural unit are each independently included in 5 mol % to 40 mol % based on 100 mol % of the (meth)acrylic copolymer.

8. The separator of claim 1, wherein
the second structural unit derived from (meth)acrylonitrile is included in an amount of 5 mol % to 40 mol % based on 100 mol % of the (meth)acrylic copolymer, and
the third structural unit derived from (meth)acrylamidosulfonic acid, (meth)acrylamidosulfonic acid salt, or a combination thereof is included in an amount of 5 mol % to 10 mol % based on 100 mol % of the (meth)acrylic copolymer.

9. The separator of claim 1, wherein
the first structural unit derived from (meth)acrylamide is included in an amount of 80 mol % to 85 mol % based on 100 mol % of the (meth)acrylic copolymer,
the second structural unit derived from (meth)acrylonitrile is included in an amount of 10 mol % to 15 mol % based on 100 mol % of the (meth)acrylic copolymer, and
the third structural unit derived from (meth)acrylamidosulfonic acid, (meth)acrylamidosulfonic acid salt, or a combination thereof is included in an amount of 5 to 10 mol % based on 100 mol % of the (meth)acrylic copolymer.

10. The separator of claim 1, wherein the (meth)acrylic copolymer has a weight average molecular weight of 200,000 to 700,000.

11. The separator of claim 1, wherein the (meth)acrylic copolymer is included in an amount of 1 wt % to 5 wt % based on a total amount of the coating layer.

12. The separator of claim 1, wherein the coating layer has a thickness of 1 μm to 5 μm.

13. The separator of claim 1, wherein the separator has a moisture content of less than or equal to 800 ppm.

14. A lithium secondary battery comprising a positive electrode, a negative electrode, and the separator for a lithium secondary battery of claim 1 between the positive electrode and the negative electrode.

* * * * *